June 6, 1944.    A. G. BRIGHT ET AL    2,350,719
SEPARATION OF SOLVENT MIXTURES
Filed May 21, 1941    2 Sheets-Sheet 1
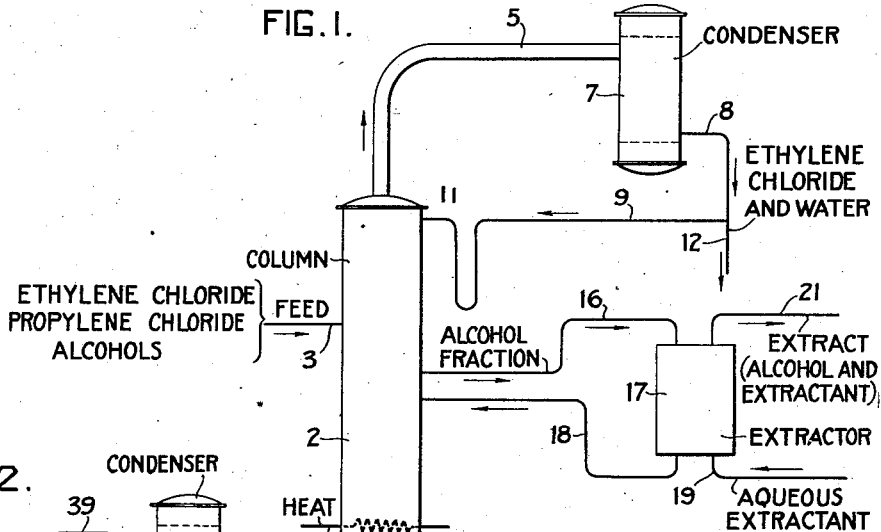
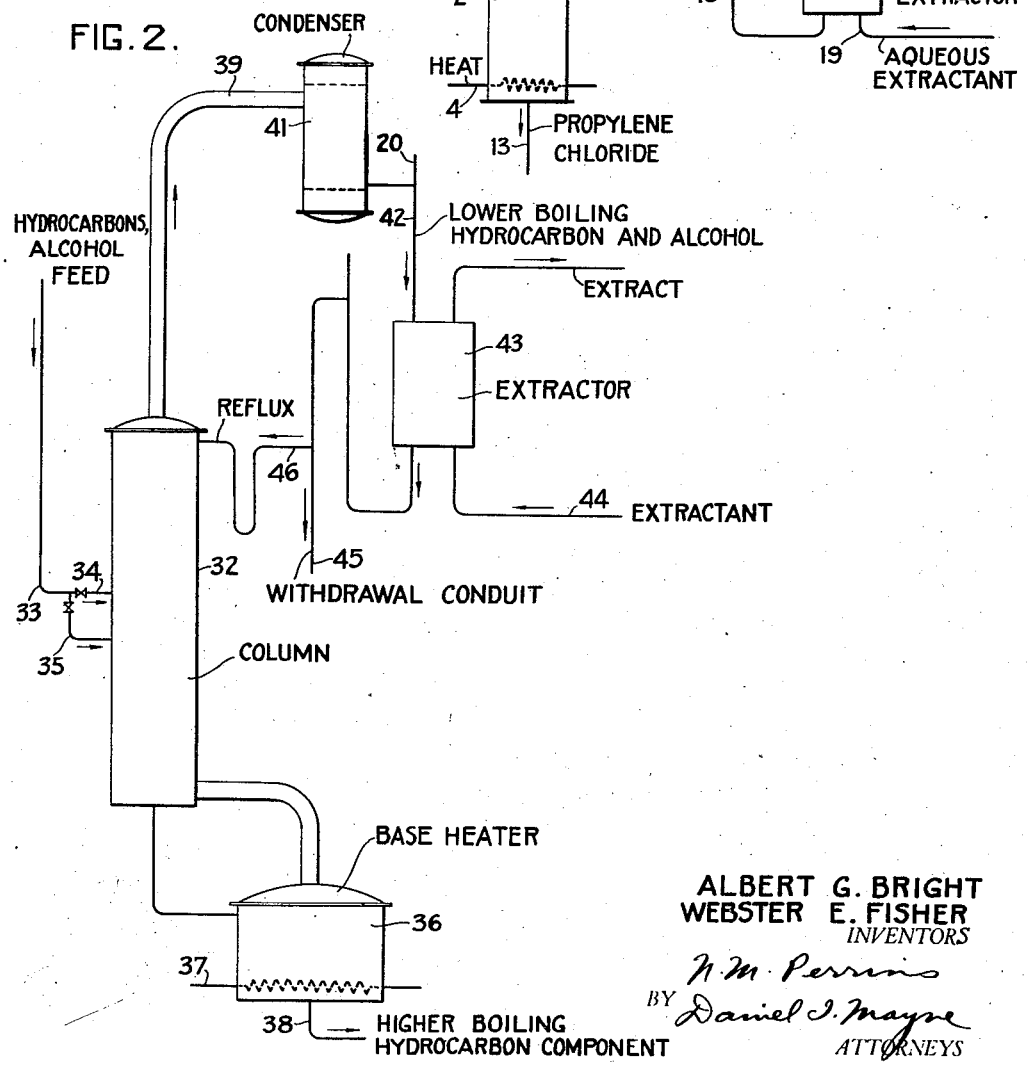
ALBERT G. BRIGHT
WEBSTER E. FISHER
INVENTORS
BY
ATTORNEYS

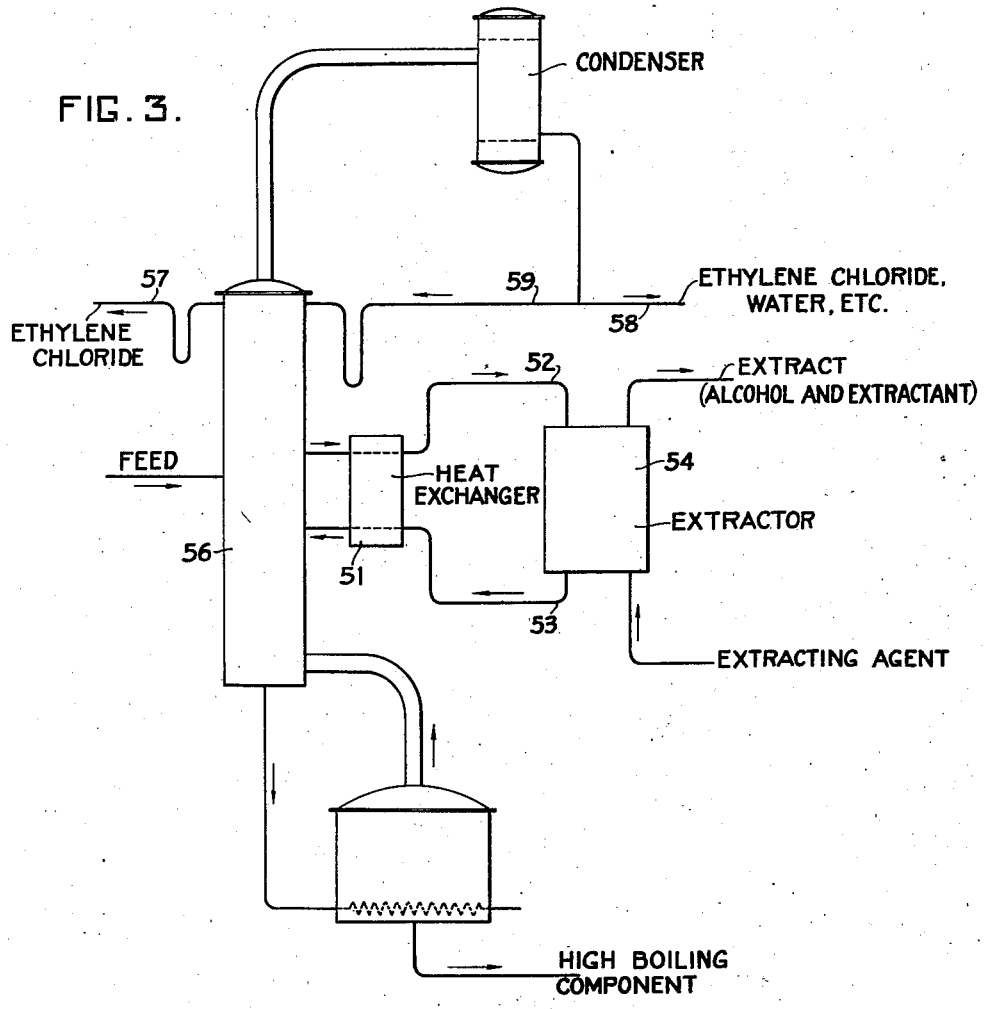

Patented June 6, 1944

2,350,719

UNITED STATES PATENT OFFICE 2,350,719

SEPARATION OF SOLVENT MIXTURES

Albert G. Bright and Webster E. Fisher, Rochester, N. Y., assignors to Eastman Kodak Company, Rochester, N. Y., a corporation of New Jersey Application May 21, 1941, Serial No. 394,530

6 Claims. (Cl. 202—43)

This invention relates to a process for separating mixtures of hydrocarbon and alcoholic solvent materials, as for example, mixtures containing various halogenated hydrocarbons and small amounts of aliphatic alcohols such as butyl alcohol.

Mixtures of the aforementioned type are obtained industrially in certain processes. Instances where such mixtures and the various type mixtures obtainable are indicated in the processes of British Patents Nos. 528,107 and 528,375. Reference to this particular source of such mixtures is merely illustrative and our invention is not limited to the obtaining from some particular source of the mixture to be separated. In any event the mixture of hydrocarbon components, amyl acetate or the like, and alcohol components, wherever obtained, may present some difficulties and defy complete separation by ordinary fractional distillation at normal pressures due to the fact that the alcoholic component may tend to contaminate either or both the distillate fraction or the residue fraction from distillation. Inasmuch as in order to reuse such materials it is desirable to have the components in a relatively pure condition, as respects, for example, the alcoholic component, it is apparent that the development of separation processes, where the components of the mixture may be separated without the aforementioned alcoholic contamination, presents a highly desirable result.

We have found new methods particularly adapted for separating mixtures of the aforementioned type, wherein not only may the components be obtained in a relatively satisfactory state of separation, but our preferred methods present additional advantages over the prior art methods in that they permit the processing of smaller amounts of certain components, as will be set forth in further detail.

This invention has for one object to provide an improved method for separating mixtures containing a plurality of hydrocarbon solvents and alcoholic components. Still another object is to provide a separation method particularly adapted to the treatment of hydrocarbon mixtures containing a small quantity of a lower aliphatic alcohol such as butyl alcohol. Still a further object is to provide a method of treating mixtures of ethylene chloride or propylene chloride containing a small amount of alcohol, whereby halogenated hydrocarbons may be obtained uncontaminated with an alcohol. A still further object is to provide a novel separatory process involving the use of both distillation and extraction. A still further object is to provide a procedure for improving extraction processes for removing certain alcohols from admixtures with hydrocarbon components. Other objects will appear hereinafter.

We have found a new distillation process whereby the alcoholic fraction may be separated from the hydrocarbon components either by permitting the alcoholic fraction to distill over with one of the hydrocarbon components, or by separating the alcohol component away from the major part of the hydrocarbon components and specially processing the alcoholic components so separated. This latter method is advantageously operated in conjunction with the removal of lower boiling point hydrocarbon component at a point a few plates from the top of the column, as will be described. For a more complete understanding of our invention, reference is made to the attached drawings, forming a part of the present application.

Fig. 1 represents a side elevation view of one arrangement of apparatus for carrying out our processes.

Figs. 2 and 3 are semi-diagrammatic side elevation views of alternative construction of types of apparatus arrangements which might be employed for carrying out certain aspects of our processes. In view of the legends appearing on the drawings, the drawings may also be considered to some extent as flow sheets of the various species of our process.

Referring now to Fig. 1, 2 represents more or less a conventional distilling column, as for example, a column having between 50 and 80 bubble plates. A feed conduit 3 is provided to an intermediate portion of the column. Suitable heating means, as for example steam coil or electrical heat, would be provided at the base of the column as at 4.

The upper portion of the column is connected through the vapor offtake conduit 5 to a condenser 7 from which the several conduits 8 and 9 lead back to the column to reflux, as at 11, or for component withdrawal as at 12. The residue withdrawal from the distillation may be provided for at 13.

However, intermediate of the column in our apparatus arrangement of this figure would be provided suitable drawoff means 16 which leads to an extractor unit 17 having a return line to the column 18. The construction of the extractor unit would preferably be similar to that set forth in copending application Serial No. 393,924. However, the exact construction is not a limitation upon our invention but one or more extraction units of various construction can be employed at point 17. Means would be provided as at 19 for the introduction of the aqueous extractant and the withdrawal as at 21 of the resultant extract.

Referring now to Fig. 2, 32 is a distillation column same as described in Fig. 1, having a feed conduit 33 leading thereto. The feed conduit may enter the column at one or more points 34 and 35, positioned intermediate thereof. Heating means will be provided at 37 for supplying steam or other heating media to the lower part of the column or base heater. A drawoff 38 for the higher boiling component also is provided in the lower part of the column or base heater.

The upper part of the column, as in Fig. 1, is provided with a vapor offtake conduit 39 which leads through condenser 41. The conduit 42 is provided for conducting the condensate to an extraction unit 43. This extraction unit may be the same as unit 17 of Fig. 1 and is provided with conduit means 44 for introducing the extracting agent, conduit 46 for returning the reflux to the distillation column, and conduit 45 for material withdrawal.

These various units would be constructed of suitable materials such as copper, stainless steel, Monel metal, and the like. It is to be understood that suitable valves, controllers, thermometers, and the like could be included for aid in controlling the systems.

Referring now to Fig. 3, the apparatus shown in this figure is substantially the same in all of the parts as that shown in Figs. 1 and 2. Hence, the description will be largely directed to those parts wherein the apparatus arrangement may differ. These parts comprise a heat exchanger 51 which may be introduced in combination with the conduits 52 and 53 leading to and from the extractor system 54 so that the material withdrawn may be extracted in a cooled condition.

At the upper portion of column 56 a withdrawal line 57 is provided at a few plates below the head of the column for permitting the withdrawal of a relatively pure (water free) halogenated hydrocarbon, as will be described hereinafter. Withdrawal and return lines 58 and 59 are comparable to those described in Fig. 1, hence, further description is unnecessary.

For a better understanding of the operation of the foregoing apparatus, as well as a better understanding of our invention, reference is made to the following examples:

Example 1

In this example the feed mixture to be separated was essentially comprised of a mixture of ethylene and propylene chlorides containing small amounts of water, either emulsified or in solution, small amounts of methyl alcohol, butyl alcohol, and the water soluble ketone, acetone. This feed mixture was introduced intermediate of the column such as shown in Fig. 2. Heat was supplied to the lower portion of the unit by means of the heating unit 37 in the base heater 36, sufficient heat being employed to cause the volatilization of an ethylene chloride distillate through conduit 39. This distillate also carried with it the methyl alcohol and acetone components in the initial feed mixture, and depending on factors such as composition of original feed, length of column 32, and the like, may also contain some propylene chloride.

The distillate was condensed in condenser 41 and flowed through conduit 42 into the extractor 43. As indicated, this extractor may comprise a spray column, packed column, or even a series of individual mixing and separating tanks.

The condensate was extracted in extractor 43 by means of an immiscible liquid introduced at 44. The raffinate from this extraction was removed from the equipment through conduit 46 to be returned as reflux to the upper part of column 32. If desired, a portion of this liquid may be withdrawn as at point 45, rather than it all being returned as reflux.

A substantial amount of the propylene chloride free from water and the ethylene chloride may be withdrawn from the lower part of the unit as at 38.

Our procedure as described in this example for treating the mixture mentioned, is an improvement over the distillation process wherein the components would be decanted in a simple decanter. Normally, with a simple decanter at the top of the column for receiving the condensate from the condenser, there is a tendency for the water soluble components to accumulate therein and prevent or interfere with the proper separation of the condensate into two layers.

By utilizing our invention not only is a separation of one of the hydrocarbon components assured, but water is removed and any low-boiling, water-soluble materials, as alcohols and ketones, prevented from accumulating in the unit where, even if they did not interfere with the proper functioning thereof, as for example, the proper functioning of the decanter, they might build up in the unit to such an extent that they might be found at the base of the column where they would contaminate the propylene chloride being withdrawn, thereby contaminating both products.

Example 2

While in the preceding example a mixture containing halogenated hydrocarbons has been described, as our invention is particularly applicable to the separation of such mixtures of halogenated hydrocarbons containing a small quantity of a lower aliphatic alcohol our process may also be applied to certain other mixtures containing an alcohol component. In this example the feed mixture to be separated comprised a mixture of amyl and butyl acetates containing butyl alcohol. According to our invention the crude mixture was supplied to a distillation column similar to that shown in Fig. 2. The mixture may be supplied to the column preferably at a lower point such as at 35, or the mixture might be introduced into a base heater of the column as at 36. Heat was supplied to the unit through heating means 37. The vapors from the base heater or still pot 36 passed up into the fractionated section of the column 32 where after separating the butyl acetate from the amyl it flowed to the base of the column from which it may be subsequently withdrawn at point 38. Because of the fact that the butyl alcohol component and butyl acetate form a constant boiling mixture, boiling at approximately 117° C. and containing approximately 47% butyl alcohol, the butyl alcohol with the butyl acetate passed out of the upper part of the column through conduit 39, was condensed in 41 and passed into extractor 43. In extractor 43 the condensate was extracted with water introduced at 44 which removed the butyl alcohol from butyl acetate. The raffinate essentially comprised of butyl acetate may be returned through conduit 36, a portion thereof being withdrawn at 45 if it is desired.

The process may be operated either in a batch or continuous manner. In a batch process the butyl alcohol would be continuously removed in extractor 43 until it had been reduced to as low a value as desired, after which the mixture of butyl and amyl acetates may be distilled to separate. In the event of this type of distillation, preferably the original mixture would be fed into the base heater 36, or in the event it is desired to carry out the same process in a more or less continuous manner, the feed mixture would preferably be introduced into an intermediate section of the column as at 35. It is also possible under some circumstances to introduce the feed into the system directly into the extractor as at point 20. The distillation would be carried out as described, or the amyl acetate containing some butyl acetate would be withdrawn through 38, depending upon the proportions of the amyl and butyl acetates.

The foregoing examples represent the preferred process for separating mixtures wherein the alcohol forms an azeotrope with one or more of the components. We have found, however, that the alcohol component may be reduced to rather a low value by operating in accordance with the other embodiment of operating our invention, as will be set forth in detail.

Example 3

In accordance with this example, the mixture to be separated contained about 50% ethylene chloride, 48% propylene chloride and about 2% butyl alcohol. This mixture was introduced into a column such as described under Fig. 1 through the feed conduit 3. Heat was supplied to the column through the heating unit 4, causing the vaporization of the mixture within the column. Sufficient heat was supplied, due regard being had for the lower boiling component, namely ethylene chloride, to cause only ethylene chloride and other low-boiling components, as the ethylene chloride-water azeotrope to be vaporized through conduit 5 to condenser 7 where the ethylene chloride vapors were condensed. The condensate was withdrawn through conduit 8, a portion of it being withdrawn for storage or reuse, through 12, the remainder being returned to the column through the reflux line 9. The residue of the distillation, namely, propylene chloride may be continuously or intermittently withdrawn through conduit 13. If desired, the propylene chloride could be removed from the lower part of the column in a vaporous condition and passed to a condenser or heat exchanger, for example, to impart heat to the feed. However, irrespective of the exact manner of removing the residue component and the distillate by operating the column so that ethylene chloride containing condensate is being removed at 12 and the propylene chloride at 13, because of the fact that butyl alcohol is less volatile than ethylene chloride it tends to fractionate down from the top of the column. On the other hand, because of the constant boiling mixture formed between butyl alcohol and propylene chloride, boiling at about 96° C. and containing approximately 7% butyl alcohol, butyl alcohol in small amounts is more volatile in propylene chloride and, therefore, we have found tends to fractionate up the column. As a result, the butyl alcohol in the presence of some propylene chloride and some ethylene chloride tends to accumulate in the middle of the column and if the accumulation became large enough would eventually force its way either to the top of the column or the bottom, contaminating one of the products. However, by tapping an intermediate point of the column by conduit 16, this butyl alcohol accumulation, together with some ethylene chloride and propylene chloride may be withdrawn. Preferably, but not necessarily, a continuous stream of butyl alcohol accumulation would be removed, and since the butyl alcohol component is considerably higher than the percentage of butyl alcohol originally present in the feed, it is capable of recovery, reuse, or other mode of disposal. As for example, should the initial feed be supplied from an extractor, the butyl alcohol accumulation withdrawn at the intermediate part of the column could be returned to this source. However, in any event, by withdrawing butyl alcohol at this point it is possible to obtain ethylene chloride at the top of the column and propylene chloride as a residue of the distillation, as already indicated.

Example 4

In operating in accordance with this example, the mixture to be treated and certain of the other conditions were comparable to those described in the preceding example. However, in accordance with this example, the processing was carried out in an apparatus such as shown in Fig. 3. The alcohol-containing fraction withdrawn intermediate of the column through conduit 52 was passed in heat exchange with the liquid being returned to the column through conduit 53. This served to cool the liquid and permitted better extraction.

The liquid returned through conduit 53 may contain some water which would, for example, form a constant boiling mixture with ethylene chloride in column 56. Since the constant boiling mixture boils below the boiling point of ethylene chloride the materials distilled from the head of the column and which would be withdrawn through conduit 58 would be comprised of this ethylene chloride and water composition. We have found, however, that relatively pure (free from water) ethylene chloride can be withdrawn, if this is desired, from some upper part of the column, as for example, at a plate a few plates below the head of the column indicated at point 57. The foregoing is merely illustrative and in other instances, where low boiling components are present, they may be permitted to distill from the head of the column, the desired compound being withdrawn at a point near, but below the head of the column. When we refer to withdrawing a distillate hereinafter, unless indicated differently by the context, we embrace instances wherein the compound may be withdrawn either through the vapor offtake conduit, as described in preceding examples, or where one or more components may be withdrawn from a point below the head of the column as set forth in the present example, and other examples herein.

Example 5

In accordance with this example we describe our process applied to the separation of another mixture by procedure substantially similar to that described in Examples 3 and 4. Referring to Fig. 1, the feed mixture to be separated in this example was comprised of ethylene chloride, propylene chloride, and butyl alcohol introduced into the column through conduit 3. Heat was supplied to the column and ethylene chloride removed and the distillate condensed in the condenser, a portion being withdrawn at 12 and the remainder being returned through conduit 9 as reflux. The proportions to be withdrawn for reuse or other purposes, through 12, or returned as reflux, would be determined by the composition of the feed, the number of plates in column 2, and other such factors. In general sufficient ethylene chloride would be returned as reflux for causing the column to function so as to fractionate the ethylene chloride and propylene chloride mixture and keep the head of the column at point 11 sufficiently cool so that essentially ethylene chloride vapors and/or its azeotrope would be emitted therefrom. The propylene chloride would be withdrawn from the base of the column as in the preceding example.

However, in this example the butyl alcohol accumulation (containing up to 7% of butyl alcohol) withdrawn through conduit 16 would be extracted in the extractor as indicated at 17. The butyl alcohol accumulation withdrawn through conduit 16 may, if desired, be passed through a condenser or heat exchanger before being passed to the extractor. For example, the ethylene chloride reflux through 9 might be in heat exchange with the alcohol fraction being withdrawn through conduit 16. Or the liquid withdrawn through conduit 16 might be passed in heat exchange with that being returned through 18.

In this example, however, the butyl alcohol accumulation was contacted with water in extractor 17. After the butyl alcohol fraction had been passed through 17 it emerged through conduit 18 more or less free of the butyl alcohol (depending upon the efficiency of the extraction, as will be discussed in detail hereinafter) and was returned to the column at a point only about one or more plates removed from the plate from which the original fraction was withdrawn. The butyl alcohol fraction withdrawn through conduit 16, as indicated in Example 3, contains some ethylene chloride and propylene chloride, but since the butyl alcohol is in a greater accumulation than in the feed, its recovery in extractor 17 by water extraction is economically feasible, whereas a similar recovery in the initial feed would not be as economical. This is due to the fact that much smaller proportions of the ethylene chloride and propylene chloride are present in the mixture when withdrawn through conduit 16.

The water layer emerging from the extractor through conduit 21 may be subjected to distillation or other treatment for recovering the chemical compounds therefrom.

In the foregoing examples wherein an alcohol, as exemplified by butyl alcohol, has been water extracted, we have found that the efficiency of the extraction may be materially improved by incorporation of a small content of a lower alcohol, as for example, methyl alcohol in the extraction medium or otherwise introducing the material into the extraction step. That the introduction of a lower aliphatic alcohol improves the extraction may readily be seen by a consideration of the following data:

*Example A.*—In this example the extraction was carried out in the absence of any lower aliphatic alcohol. Approximately 100 gm. of a propylene chloride-butyl alcohol solution containing .053 gm. of butyl alcohol per gm. of propylene chloride was thoroughly extracted with 100 gm. of water by a continued intermixing of the water and the solution. Analysis of the resultant extract showed that .022 gm. of the butyl alcohol per gm. of the propylene chloride had been extracted into the water phase. Accumulations showed that at equilibrium the distribution ratio was 1.5-1 ni favor of the propylene chloride layer, the concentrations being calculated as gm. of butyl alcohol per gm. of propylene chloride or of water.

*Example B.*—In accordance with this example, the same type of mixture was extracted with water. However, a small content of methyl alcohol was included for improving the extractability of the butyl alcohol. That is, 100 gm. of a propylene chloride-butyl alcohol solution containing .053 gm. of butyl alcohol per gm. of propylene chloride were shaken with 100 gm. of water. 10 gm. of methyl alcohol were added to the propylene chloride-butyl alcohol mixture before extraction. Upon separating the phases, and analysing, it was found that .029 gm. of butyl alcohol per gm. of propylene chloride had been extracted by the same amount of water as had been used in Example A. Expressing the results as a distribution ratio, it is found that the distribution ratio has been changed so that it is 1.14-1 in favor of the water layer.

*Example 6*

In accordance with this example the mixture to be treated was of a somewhat similar nature comprising cyclohexane, ethylene chloride, and propylene chloride, together with extractable components such as methyl and butyl alcohols and ketones. This mixture was supplied to an intermediate section of a column similar to column 32 of Fig. 2. The distillate from the top of this column, after being condensed, is passed to a decanter or a countercurrent extractor, or both, where at least a part of the distillate is extracted with water.

The distillate resulting in this process would comprise the cyclohexane and ethylene chloride constant boiling mixture (boiling at approximately 75° C. and comprising approximately 49% cyclohexane) together with certain alcoholic and ketonic components which are removed in the aforesaid extraction. This hydrocarbon layer, after the treatment of extraction or decantation and extraction, was returned to the upper portion of the column through conduit 46 for reflux.

However, in accordance with the procedure of this example, several plates below the top of the column, in a manner comparable to that shown in Fig. 3 at conduit 57, a mixture of ethylene chloride and cyclohexane (as for example from about 50% to 70% ethylene chloride) is removed substantially free from water or any of the aforementioned alcoholic or ketonic components. The residue from the distillation comprises propylene chloride containing ethylene chloride in excess of the aforesaid constant boiling mixture and butyl alcohol inasmuch as the lower boiling alcoholic and ketonic components of this particular mixture would predominate in the distillate.

The foregoing examples have been set forth primarily for illustrating certain preferred embodiments of our invention. However, certain phases of our invention are not limited to the exact ingredients disclosed. That is, for example, the introduction of a lower aliphatic alcohol for improving the extractability of a higher alcohol may be applied in, for example, the separation of alcohol such as butyl alcohol from various hydrocarbons such as cyclohexane, benzene, heptane, ligroin, or from mixtures of hydrocarbons and halogen-substituted hydrocarbons, the latter of course constituting the type of compound described in a number of our examples. While our invention is particularly adapted to the treatment of hydrocarbon-alcohol containing mixtures, as indicated, our invention in certain of its embodiments embraces the treatment of various other mixtures, as for example, mixtures of esters with alcohols such as butyl alcohol. It is, therefore, apparent from the foregoing that our invention embraces certain advantages, arrangements and changes; hence, we do not wish to be restricted excepting insofar as is necessitated by the prior art and the spirit of the appended claims.

We claim:

1. A process for separating a feed mixture comprised of ethylene chloride, propylene chloride, and butyl alcohol which comprises distilling the mixture, volatilizing off a distillate essentially comprised of ethylene chloride, withdrawing a residue essentially comprised of propylene chloride, intermittent of the foregoing distillation removing a fraction comprised of ethylene chloride, propylene chloride, and butyl alcohol, the concentration of the butyl alcohol, however, being greater than its concentration in the feed mixture, cooling the withdrawn mixture and subjecting the withdrawn mixture to extraction with an aqueous extractant for separating the butyl alcohol, said extraction being carried out in the presence of a small content of methyl alcohol whereby the butyl alcohol extraction is facilitated, and returning the residue of the extraction to the distillation step adjacent the point of withdrawal.

2. A process for separating a feed mixture comprised of two different halogenated hydrocarbons and butyl alcohol which comprises distilling the mixture, volatilizing off a distillate essentially comprised of the lower boiling hydrocarbon, withdrawing a residue essentially comprised of the higher boiling hydrocarbon, intermittent of the foregoing distillation removing a fraction comprised of said hydrocarbon and butyl alcohol, the concentration of the butyl alcohol, however, being greater than its concentration in the feed mixture, subjecting the withdrawn mixture to extraction with an extractant for separating the butyl alcohol, said extraction being carried out in the presence of a small content of methyl alcohol whereby the butyl alcohol extraction is facilitated, and returning the residue of the extraction to the distillation step adjacent the point of withdrawal.

3. A process for separating a feed mixture comprised of two different halogenated hydrocarbon components boiling between 80° C. and 200° C., mixed with butyl alcohol which comprises distilling the mixture, volatilizing off a distillate essentially comprised of the lower boiling component, withdrawing a residue essentially comprised of the higher boiling component, intermittent of the foregoing distillation removing a fraction comprised of said hydrocarbon components and butyl alcohol, the concentration of the butyl alcohol, however being greater than its concentration in the feed mixture, cooling the withdrawn mixture and subjecting the withdrawn mixture to extraction with an extractant for separating the butyl alcohol.

4. A process for separating a feed mixture comprised of at least two different halogenated hydrocarbon components separable by distillation, and a water soluble lower aliphatic alcohol which comprises distilling the mixture, volatilizing off a distillate comprising one of said components and returning a portion thereof as reflux, withdrawing a residue essentially comprised of another of said components, intermediate of the foregoing distillation removing a fraction comprised of said components and said alcohol, the concentration of the alcohol, however, being greater than its concentration in the feed mixture and cooling the withdrawn alcohol-containing fraction by flowing the same in heat transfer relationship with liquid being returned to the distillation, but out of direct admixture therewith.

5. A process of treating a mixture comprising cyclohexane, ethylene chloride, propylene chloride and at least one water soluble component from the group consisting of lower alkyl alcohols and ketones which comprises subjecting the aforesaid mixture to distillation, volatilizing a distillate containing a constant boiling mixture of cyclohexane and ethylene chloride together with at least one of said water soluble components, subjecting at least a part of the distillate to water extraction, returning at least a part of the residue of this extraction to the distillation for reflux and withdrawing a component essentially comprised of ethylene chloride from an upper point in the distillation.

6. A process for separating a feed mixture comprised of ethylene chloride, propylene chloride and butyl alcohol which comprises distilling the mixture, volatilizing off a distillate essentially comprised of ethylene chloride, withdrawing a residue essentially comprised of propylene chloride, intermittent of the foregoing distillation, removing a fraction comprised of ethylene chloride, propylene chloride, and butyl alcohol, the concentration of the butyl alcohol being greater, however, than its concentration in the feed mixture, subjecting the withdrawn mixture to extraction with an aqueous extractant for separating the butyl alcohol and returning the residue of the extraction to the process.

ALBERT G. BRIGHT.
WEBSTER E. FISHER.